United States Patent [19]

Ogasawara

[11] Patent Number: 5,600,398

[45] Date of Patent: Feb. 4, 1997

[54] AUTOMATIC FOCUS ADJUSTMENT DEVICE AND METHOD

[75] Inventor: Akira Ogasawara, Kanagawa-ken, Japan

[73] Assignee: Nikon Corporation, Tokyo, Japan

[21] Appl. No.: 378,353

[22] Filed: Jan. 25, 1995

[30] Foreign Application Priority Data

May 19, 1994 [JP] Japan .................................. 6-105370

[51] Int. Cl.⁶ .................................................. G03B 13/36
[52] U.S. Cl. ............................. 396/125; 396/96; 396/133
[58] Field of Search .............................................. 354/402

[56] References Cited

U.S. PATENT DOCUMENTS

| | | |
|---|---|---|
| 4,473,286 | 9/1984 | Watanabe et al. . |
| 5,003,166 | 3/1991 | Girod ................................. 250/201.4 |
| 5,410,383 | 4/1995 | Kusaka et al. ......................... 354/402 |

FOREIGN PATENT DOCUMENTS

| | | |
|---|---|---|
| 62-227109 | 10/1987 | Japan . |
| 63-5316 | 1/1988 | Japan . |
| 2-146010 | 6/1990 | Japan . |
| 3-249715 | 11/1991 | Japan . |
| 4-1330015 | 5/1992 | Japan . |

*Primary Examiner*—Safet Metjahic
*Assistant Examiner*—D. P. Malley
*Attorney, Agent, or Firm*—Oliff & Berridge

[57] ABSTRACT

An automatic focus adjustment device and method is used after focussing a shooting lens so as to maintain both stability and focussing precision. Shooting lens defocus amounts are calculated based on focus state detection signals repeatedly output from an electric charge type photosensitive device that receives light rays from a subject. Focus adjustment is accomplished until the shooting lens is in the predetermined focussing state based on these defocus amounts. After the shooting lens has reached the predetermined focussing state, the calculated defocus amounts are statistically processed. The determination to resume focus adjustment of the shooting lens is made based on this processing.

21 Claims, 14 Drawing Sheets

AUTOMATIC FOCUS ADJUSTMENT DEVICE AND METHOD

BACKGROUND OF THE INVENTION

1. This invention generally relates to an automatic focus adjustment device and method for use with a camera or the like.

2. Description of Related Art

An automatic focus adjustment device for use with cameras is known. For example, Japanese Unexamined Patent Publication Hei 2-146010, the subject matter of which is incorporated herein by reference, includes a so-called "overlap servo" function that tracks moving subjects by servo driving (hereinafter referred to as AF servo) the shooting lens to the focus position even when the charge accumulation type photosensitive element (hereinafter referred to as the AF sensor) is accumulating charge.

FIG. 10 is a diagram of a camera equipped with an automatic focus adjustment device that moves the shooting lens 1 to the focus position by driving a servo motor 7. Focus detection light rays pass through the shooting lens 1 and are formed into an image on the AF sensor 2 (such as a CCD or the like) within the camera body. Optical image signals from the AF sensor 2 are sent, via an interface 3, to a microcomputer 4 that controls the entire system.

The optical image pattern of the AF sensor 2 either undergoes A/D conversion in the interface 3 and outputs to the microcomputer 4, or the image pattern is amplified to a suitable signal level by the interface 3 and then undergoes direct A/D conversion by an A/D converter in the microcomputer 4. The microcomputer 4 calculates a defocus amount using a preset algorithm to process the optical image pattern, which has been converted into a digital signal, and calculates the lens driving amount needed to focus the shooting lens 1 based on the defocus amount. An explanation of the specific optical principles and algorithms used in defocus amount detection are omitted because the principles and algorithms are well known in the art.

An encoder 6 monitors the movement of the shooting lens 1 and produces a pulse each time the shooting lens 1 moves a predetermined amount along the optical axis. The microcomputer 4 drives the servo motor 7 by outputting the calculated lens driving amount to the driver 5. The driver 5 then drives the shooting lens 1 in the appropriate direction of focussing. Furthermore, the microcomputer 4 monitors the amount of movement of the shooting lens 1 through feedback pulses from the encoder 6 and stops the driving of the servo motor 7 when the number of counted feedback pulses equals the number of pulses corresponding to the defocus amount. Normally, the encoder 6 includes a photo-interrupter mounted on part of the reduction gear and the rotation shaft of the servo motor 7. The encoder 6 detects the rotation of the motor 7 driving the shooting lens 1.

As shown in FIG. 11, the defocus amount is the relative image plane discrepancy amount $\Delta Z$ between the film plane (predicted image plane) and the plane in which the focus detection light rays that have passed through the shooting lens 1 are formed into an image (the image plane). The defocus amount is essentially equal to the lens driving amount necessary to effect focussing of the shooting lens 1. The shooting lens 1 is driven backward by the defocus amount $\Delta Z\alpha$ when a focus point is in front of the subject. The shooting lens is driven forward by the defocus amount $\Delta Z\beta$ when a point of focus is behind the subject. The defocus amount $\Delta Z$ and the lens driving amount generally are not equal. However, the two are described as equal herein for illustration.

Japanese Unexamined Patent Publication Hei 2-146010 describes an overlap servo that simultaneously conducts distance measurement and lens driving. These two functions were previously conducted separately in sequence. With the overlap servo of Japanese Unexamined Patent Publication Hei 2-146010, the calculated defocus amount with the shooting lens 1 halted is equivalent to the defocus amount detected through distance measurement by the AF sensor 2 while the shooting lens is moving. Hereafter, this position will be referred to as the "distance measurement position." In other words, the amount of movement from this distance measurement position to the shooting lens position when the defocus amount computations are completed is subtracted from the calculated defocus amount. The next drive target for the shooting lens 1 is determined based on the defocus amount.

The method of calculating the distance measurement position in the overlap servo set forth in Japanese Unexamined Patent Publication Hei 2-146010 will be described with reference to FIG. 12. FIG. 12 shows an example when the shooting lens 1 is servo driven by the servo motor 7 to focus on the subject. The vertical axis on the left side represents the position Z of the lens along the optical axis. The horizontal axis represents the time t while the curve S shows the movement track as the shooting lens 1 is driven to the focus position. Feedback pulses produced by the encoder 6 during movement of the shooting lens 1 are shown below the time axis t.

As shown in FIG. 12, ta represents time when accumulation starts in the AF sensor 2 during movement of the shooting lens 1 and tb represents time when accumulation is concluded. The AF sensor 2 continuously accumulates electric charge in accordance with the optical image on the sensor light-receiving plane during the electric charge accumulation time interval T (also called the accumulation time interval or the accumulation period) from the time ta to the time tb. However, during this time, the light-receiving plane of the AF sensor 2 is continuously moving because of the movement of the shooting lens 1. The feedback pulses are output from the encoder 6 based on the movement of the shooting lens 1. When the continuous charge in the optical image is closely approximated by the optical image at the time when a feedback pulse is produced and the pulses are produced with sufficient resolution with respect to movement of the shooting lens 1, then errors from the approximation will be small and the final output of the AF sensor 2 can represent the sum of the infinitesimal electric charge accumulation amounts. The defocus amount obtained by processing the output of the AF sensor 2 using an appropriate AF algorithm is essentially the same as the weighted average of the defocus amounts obtained from the optical image on the AF sensor 2 when each pulse is produced. Weighting is accomplished using a ratio of the size of the infinitesimal electric charge accumulation amount during each respective pulse interval relative to the total electric charge accumulation amount. If the light quantities on the AF sensor 2 are assumed to be essentially uniform during accumulation in the sensor, the ratio of the size of the infinitesimal electric charge accumulation amount during each pulse interval relative to the total electric charge accumulation amount will simply be the ratio of each pulse interval relative to the total electric charge accumulation time.

The feedback pulses are counted by a counter in the microcomputer 4. Since this count value is the sum of the lens movement, the count value corresponds to the lens position Z along the optical axis (as shown by the vertical axis of FIG. 12). These two values have a nearly linear relationship based on whether the position along the optical axis is expressed in terms of distance (mm) or pulse number (count). The vertical axis to the right in FIG. 12 represents the position along the optical axis based on the pulse number. While t1, t2, . . . ,tn represent times when pulses are produced from the start of accumulation in the AF sensor 2, P1, P2, . . . , Pn correspond to count values during the same time. The value fn is the instantaneous defocus amount converted to a pulse number when the approximation is such that the shooting lens 1 is stopped at position Pn during the interval from Pn−1 to Pn and can be thought of as the contribution of $(tn-(tn-1))/T$ to the defocus amount. Pf represents the value of the defocus amount following subject focussing. Accordingly, fn can be expressed by:

$$fn = Pf - Pn \quad (1)$$

Therefore, the defocus amount f (expressed as a pulse number) is:

$$\begin{aligned} f &= \Sigma(tn-(tn-1))*fn/T \\ &= \Sigma(tn-(tn-1))*(Pf-Pn)/T \\ &= \Sigma(tn-(tn-1))*Pf/T - \Sigma(tn-(tn-1))*Pn/T \end{aligned} \quad (2)$$

Here, because the total of the accumulation times $(tn-(tn-1))$ is equal to the total accumulation time T, the result is:

$$T = \Sigma(tn-(tn-1)) \quad (3)$$

Because the first term in Equation 2 includes Pf, the defocus amount f is expressed as:

$$f = Pf - \Sigma Pn*(tn-(tn-1))/T \quad (4)$$

Equation 4 expresses the idea that when the position of the shooting lens 1 is expressed in terms of the pulse count value, the defocus amount obtained when lens movement and accumulation in the AF sensor 2 are conducted simultaneously is the same as the defocus amount obtained by distance measurement when the shooting lens 1 is stopped at the position $$Pm = \Sigma Pn*(tn-(tn-1))/T \quad (5)$$

Hereafter, the position of the shooting lens expressed by Equation 5 will be referred to as the "average distance measurement position." At the time tc when the AF algorithm has been concluded and the defocus amount f has been obtained, the lens driving amount is computed by subtracting the value Pm (from Equation 5) from the count value Pc at that time. In other words, the overlap servo determines the average distance measurement position from Equation 5.

The operation of a conventional device is explained hereafter with reference to the flowcharts of FIGS. 13 and 14. FIG. 13 is the main routine depicting operations of the AF sensor 2 and FIG. 14 is a routine depicting an interruption process during accumulation in the sensor.

As shown in FIG. 13, the buffer S, used for the accumulation value in Equation 5, is cleared in step S100. Accumulation starts in the AF sensor 2 during step S102. In step S104, a determination is made whether the electric charge accumulation has been conducted for a time interval appropriate for the strength of the light being received. An electric charge accumulation conclusion may be determined by providing a monitoring sensor to monitor light quantities on the AF sensor 2. The accumulation conclusion is determined when the output of the monitoring sensor exceeds a preset value. This method is often referred to as hard AGC. Alternatively, the accumulation conclusion may be determined by predicting the current accumulation time from a previous accumulation time and output level of the AF sensor 2. In such a case, the charge accumulation is accomplished after setting a timer to measure the accumulation times with respect to a predicted time. This method is referred to as soft AGC. When electric charge accumulation in the AF sensor 2 is concluded by either hard AGC or soft AGC, the output of the AF sensor 2 undergoes A/D conversion in the A/D converter of the microcomputer 4 and is stored in RAM. In step S106, the output data stored in RAM is processed using an AF algorithm to calculate a defocus amount. The calculated defocus amount is then converted in step S108 into a feedback pulse number Ps1.

The interruption routine shown in FIG. 14 is executed each time a feedback pulse is output from the encoder 6 accompanying the movement of the shooting lens 1 during accumulation in step S104. This routine performs the computations of Equation 5 and adds the result to the buffer S each time the routine of FIG. 14 is entered. As shown in FIG. 14, step S118 determines whether accumulation is taking place in the AF sensor 2. In such a case, the program advances to step S120. If accumulation is not taking place, the program returns to the main program in FIG. 13. In step S120, the elapsed time $(tn-(tn-1))$ from the previous interruption is added and the current time is stored in memory for the next interruption process. In the subsequent step S122, the feedback pulse count value Pn that was read is multiplied by the elapsed time $(tn-(tn-1))$ and is added to the buffer S. When the AF algorithm accumulation is concluded, $$S = \Sigma Pn*(tn-(tn-1)) \quad (6)$$

In returning to the main program of FIG. 13, the average distance measurement position Pm is calculated in step S110 using the value in the buffer S obtained by the interruption process indicated by Equation 6 and dividing the valve of the buffer S by the accumulation time T. In the subsequent step S112, the pulse count value is read and labeled Pc. In step S114, the servo target pulse number Ps2 is calculated as $$Ps2 = Ps1 - (Pc - Pm) \quad (7)$$

Ps1 represents the defocus amount calculated in step S108 (expressed as a pulse number), Pc represents the count value read in step S112 and Pm is the average distance measurement position calculated in step S110. In step S116, the servo target is refreshed to the value Ps2 as calculated from Equation 7 and the lens driving continues.

Normally, the processes from step S100 to step S116 is repeated several times while the shooting lens 1 is being servo driven to the target position. The distance measurement precision improves each time because the defocus amount becomes smaller. Focussing can frequently be effected with a single movement of the lens. In addition, it is possible for the lens to move to the next position quickly even when the lens stops in front of the subject or conversely moves beyond.

A focus state determination method for the described overlap servo is set forth in Japanese Unexamined Patent Publication Hei 4-133015.

In this method, Pα is the pulse count value at the start of sensor accumulation, Pβ is the pulse count value at the conclusion of accumulation and Z is the coefficient of conversion from the pulse count value to the defocus amount (mm). Accordingly, the lens movement amount Z (Pβ−Pα) is used for focus determination. For example, focus determination is not conducted when the lens movement amount is greater than a certain threshold value $Zh$. That is, focus determination only occurs when the following situation is true.

$$|Z(P\beta - P\alpha)| < Zh \tag{8}$$

Therefore, a reduction of the precision and reliability of the distance measurement can be prevented when the amount of lens movement during sensor accumulation is large.

When the conditions established by Equation 8 are satisfied, the lens is considered to be in focus when the defocus amount $def(m)$ is smaller than the threshold value $Zi$ as in the following:

$$|def(m)| < Zi \tag{9}$$

Thus, the lens is considered in focus when the conditions in both Equations 8 and 9 are met and the pulse number $Ps2$ of the servo target calculated with Equation 7 is established as the subsequent lens driving amount.

When the subject moves irregularly and when the photographer changes subjects while the camera is in the auto focus driving mode, a continuous mode is provided where the AF servo is continuously conducted to maintain the focus state while tracking a subject.

However, conventional automatic focus adjustment devices are deficient when the defocus amounts do not satisfy the focus determination standard established by Equation 9. Therefore, lens driving is conducted with excessive sensitivity.

Because such deficiencies arise because of the high responsiveness of the servo, the servo capacity should be thought of as being normal. However, this is considered to be a "defect" with an automatic focus camera because it is not desirable for lens movement to be performed intermittently after focussing.

This kind of deficiency arises when the shooting lens suddenly moves to the infinity point because the photographer measures the distance to an unwanted distant scene while changing subjects or when the shooting lens effects a hunting action because a defocus amount greater than the threshold amount is detected due to shaking of the camera or errors in distance measurement.

To handle this kind of deficiency, a Japanese Unexamined Patent Publication Sho 62-227109 describes the threshold value of focus determination being endowed with hysteresis. This results in a drop in the servo responsiveness following focussing because the threshold value following focussing becomes greater.

However, even this kind of method is ineffective in cases as described above when the distance to an undesired distant scene is measured and the subject is changed. In addition, when the detected defocus amount is less than a large threshold value after focussing, focus adjustment cannot be conducted even with poor focussing precision.

SUMMARY OF THE INVENTION

The present invention provides an automatic focus adjustment device that conducts focus adjustment after focussing the shooting lens while maintaining both stability and focussing precision.

This invention therefore provides an automatic focus adjustment device including an electric charge accumulation type photosensitive device that receives light rays from a subject through the shooting lens. The electric charge accumulation type photosensitive device repeatedly outputs focus state detection signals. The device also includes a defocus amount computation device that calculates the defocus amounts of the shooting lens based on the focus state detection signals output from the photosensitive device. A drive control device conducts focus adjustment until the shooting lens is in a predetermined focussing state. The adjustment is accomplished based on the defocus amounts calculated by the defocus amount computation device. The device further provides a statistical processing device that statistically processes the calculated defocus amounts after the shooting lens has reached the predetermined focussing state. The drive control device determines whether to resume focus adjustment based on the statistical processing within the statistical processing device.

The automatic focus adjustment device further includes an average/variance computation device that calculates an average value and a variance of the calculated defocus amounts. The drive control device resumes focus adjustment of the shooting lens when the average value calculated by the average/variance computation device is greater than a first preset value and the variance is smaller than a second preset value.

The average/variance computation device still further calculates the average value and the variance of the calculated defocus amounts over a preset time interval. The drive control device then determines whether to resume focus adjustment of the shooting lens based on the average values and variances calculated by the average/variance computation device. The preset time interval may further be changed at will.

Still further, the second preset value may be based on the average value calculated by the average/variance computation device. Even still further, the second preset value may be approximately proportional to the square of the calculated average value.

This invention additionally provides an automatic focus adjustment method that calculates the defocus amount based on the focus state detection signals repeatedly output from a charge accumulation type auto focus sensor that receives light rays from the subject through the shooting lens and that conducts focus adjustment until the shooting lens is in a predetermined focussing state. Defocus amounts are calculated based on the focus state detection signal output from the autofocus sensor. After the shooting lens has reached the predetermined focussing state, the calculated defocus amounts are statistically processed. The determination to resume focus adjustment is based on this processing.

The invention further provides a method that resumes focus adjustment of the shooting lens after the shooting lens has reached the predetermined focussing state when an average value of the calculated defocus amounts is greater than a first preset value and a variance is smaller than a second preset value.

The average value and the variance of the defocus amounts may be calculated from the focus state detection signals output from the auto focus sensor over a preset time interval preceding the current time. The determination to resume focus adjustment is based on the average values and variances.

The second preset value may be established based on the defocus amounts calculated after the shooting lens has reached the focussing state. Alternatively, the second preset value may be approximately proportional to the square of the average value of the defocus amounts output from the auto focus sensor after the shooting lens has reached the focussing state.

The shooting lens defocus amount may be calculated based on the focus state detection signals repeatedly output from the charge accumulation type photosensitive device (also referred to as an auto focus sensor) that receives light rays from the subject through the shooting lens. Focus adjustment is accomplished until the shooting lens is in a predetermined focussing state based on the defocus amount. After the shooting lens has reached the predetermined focussing state, the calculated defocus amounts are statistically processed and resumption of focus adjustment is determined based on the statistical processing. For example, focus adjustment is resumed when the average value of the defocus amounts is greater than a first preset value and the variance is smaller than a second preset value. Accordingly, focus adjustment is resumed only when the defocus amounts following focussing are detected several times in a stable manner without focus adjustment being conducted frequently in accordance with the results of distance measurement following focussing. It is therefore possible to increase focussing precision and the stability of focus adjustment following focussing.

In addition, the average value and the variance may be calculated for defocus amounts over a preset time interval after focussing. The determination to resume focus adjustment may be based of the average value and variance. Accordingly, the memory capacity of the memory can be conserved to keep mounting costs down and reduce the time needed for calculations.

Furthermore, the preset time interval for determining the past defocus amount data items used in calculating the average value and variance can be changed at will. Therefore, the photographer may establish the responsiveness of the focus adjustment following focussing.

Still further, the second preset value may be established based on the average value of the defocus amounts after the shooting lens has reached the focussing state. Alternatively, the second preset value may be approximately proportional to the square of the average value of the defocus amounts after the shooting lens has reached the focussing state. It is then possible to make a more appropriate determination for resumption of focus adjustment following focussing.

Other objects, advantages and salient features of the invention will become apparent from the following detailed description taken in conjunction with the annexed drawings, which disclose preferred embodiments of the invention.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

Figure 1:
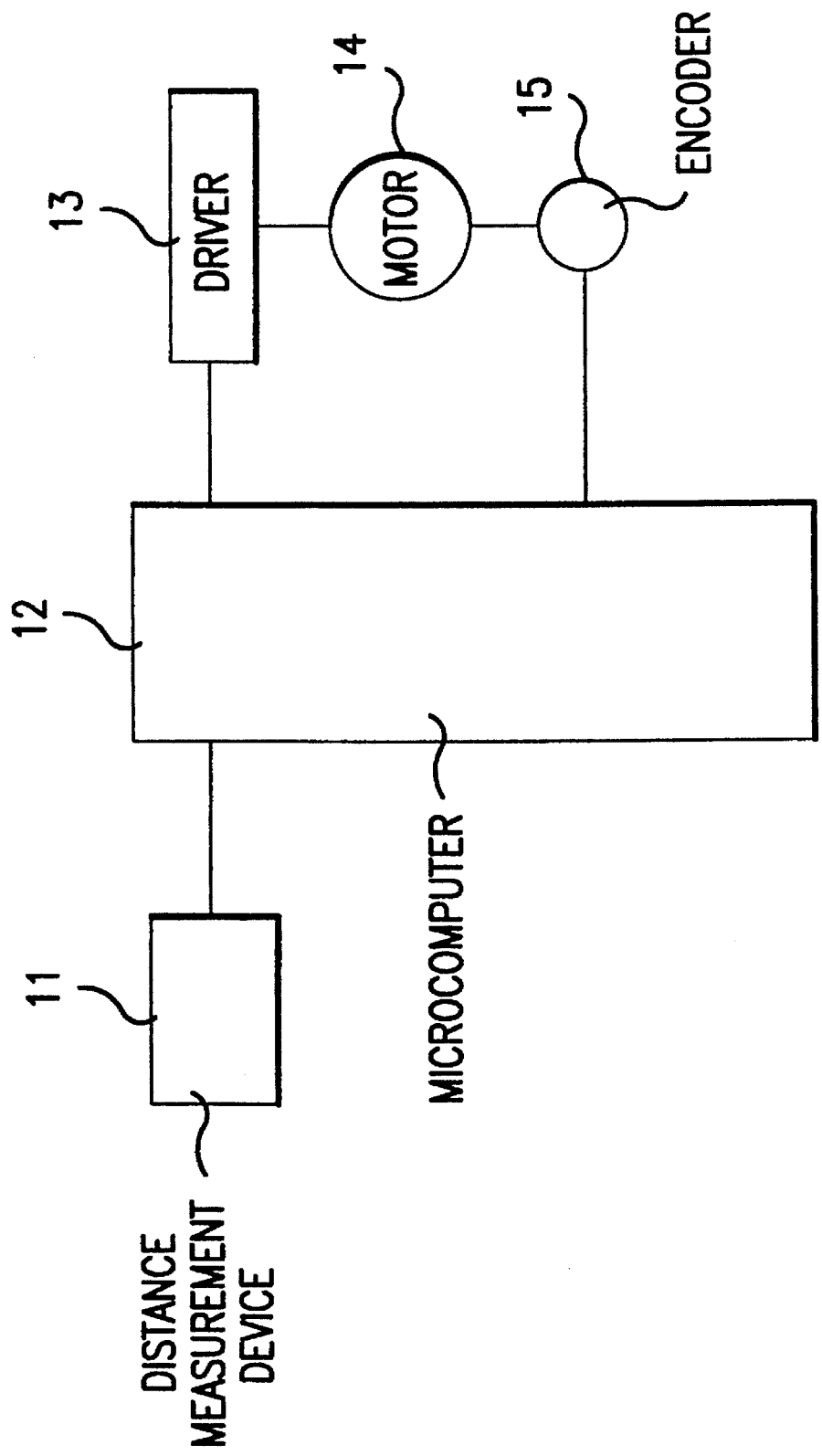
FIG. 1 shows an automatic focus adjustment device incorporating embodiments of the present invention.

FIG. 1 illustrates one embodiment of the present invention. A distance measurement device 11 includes a charge accumulation type photosensitive element that receives light from the subject through the shooting lens and repeatedly accumulates charge. The distance measurement device 11 outputs focus detection signals to a microcomputer 12 indicating the focus adjustment state of the shooting lens. The microcomputer 12 is equipped with peripheral components including a memory and an A/D converter to calculate the defocus amount of the shooting lens based on the distance measurement results from the distance measurement device 11. The microcomputer 12 further controls the driving direction and amount of the shooting lens based on the defocus amounts. In this embodiment, driving of the shooting lens is controlled by calculating an average value and a variance of the defocus amounts. A driver 13 drives the motor 14 causing the shooting lens to move based on the command signals from the microcomputer 12. The encoder 15 is linked to the motor 14 and provides feedback to the microcomputer 12 by producing a pulse signal each time the shooting lens moves a predetermined amount.

Figure 2:
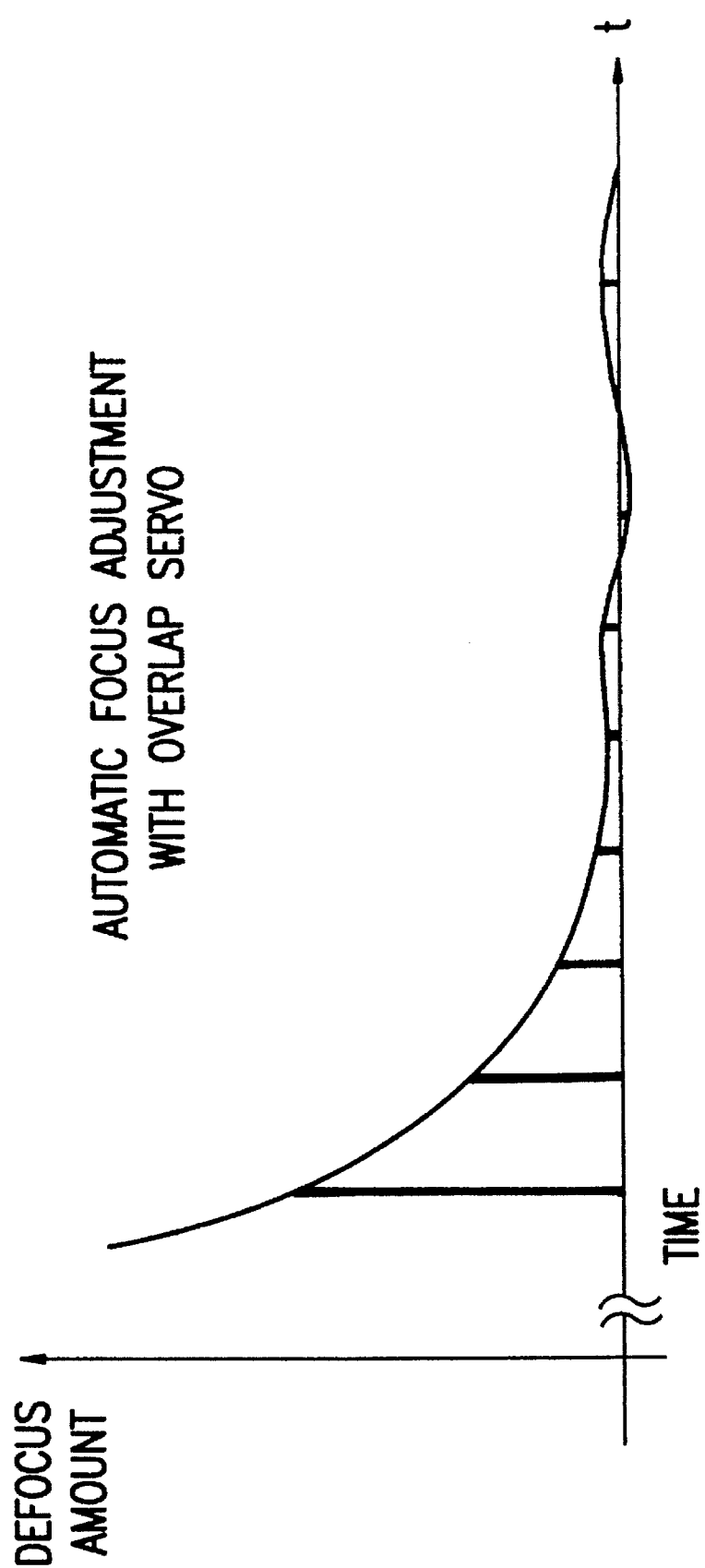
FIG. 2 shows fluctuation of defocus amounts when automatic focus adjustment is conducted relative to a stationary subject.

FIG. 2 is a graph showing changes in the defocus amount when automatic focus adjustment is conducted with an overlap servo relative to a stationary subject. In FIG. 2, lens driving is not performed after the focus determination is made using Equation 9. As shown in FIG. 2, the defocus amount gradually declines until focussing occurs. However, even after focussing, the defocus amount fluctuates slightly each time the distance is measured.

Figure 3:
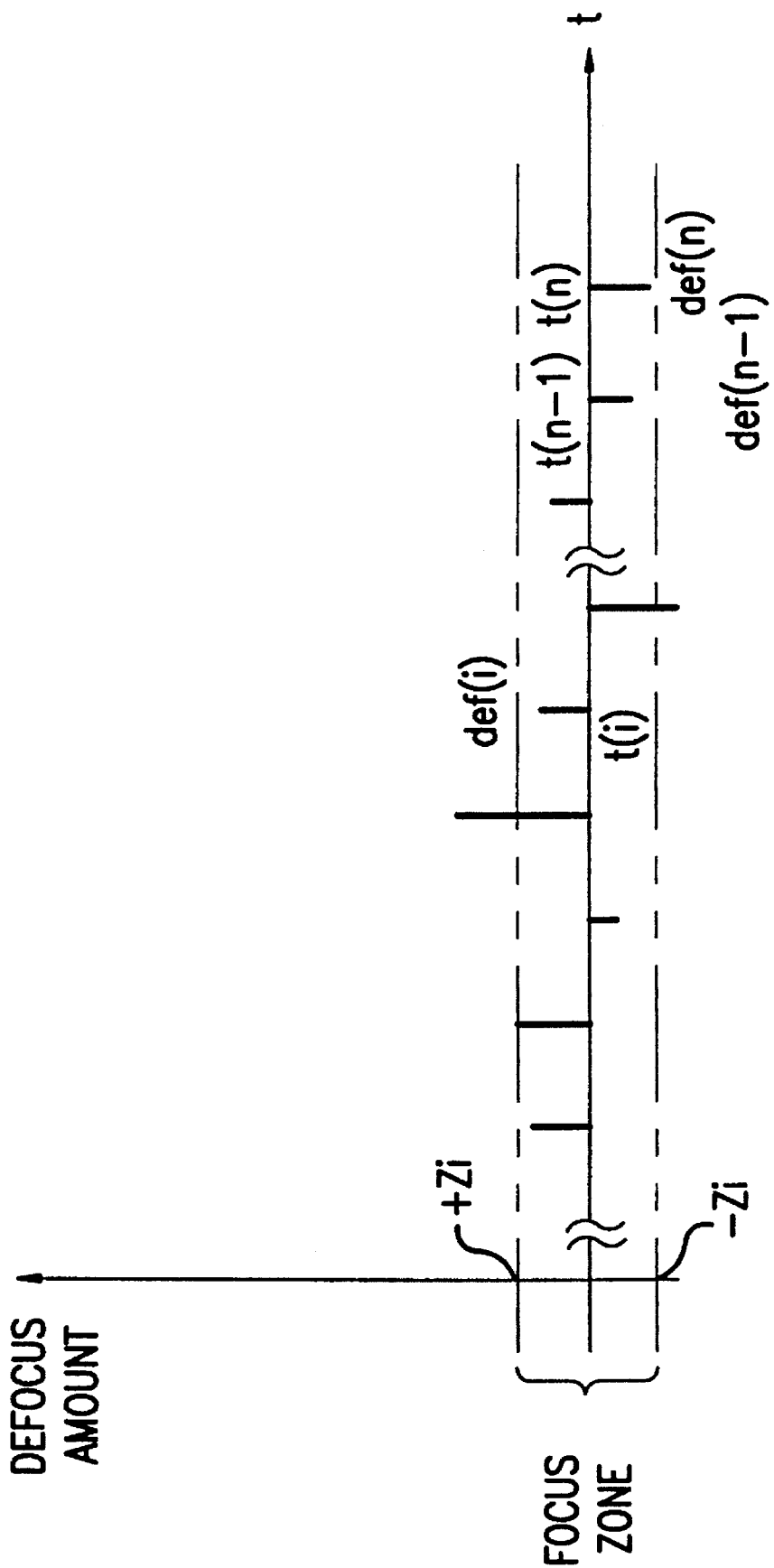
FIG. 3 shows an example of the defocus amounts detected following focussing.

FIG. 3 shows the defocus amounts detected following focussing. In the figure, t(i) represents a central time from the accumulation period while def(i) represents a defocus amount calculated as a result of this accumulation. The upper limit of the focussing zone is the threshold value $+Z_i$ while the lower limit is the threshold value $-Z_i$. As shown, the defocus amounts following focussing may exceed the threshold values $\pm Z_i$. This frequently occurs when measuring the distance to a subject having a low contrast. In this example, lens driving should not be resumed each time the defocus amount exceeds the focussing threshold value $\pm Z_i$ because this could overwork the user.

Figure 4:
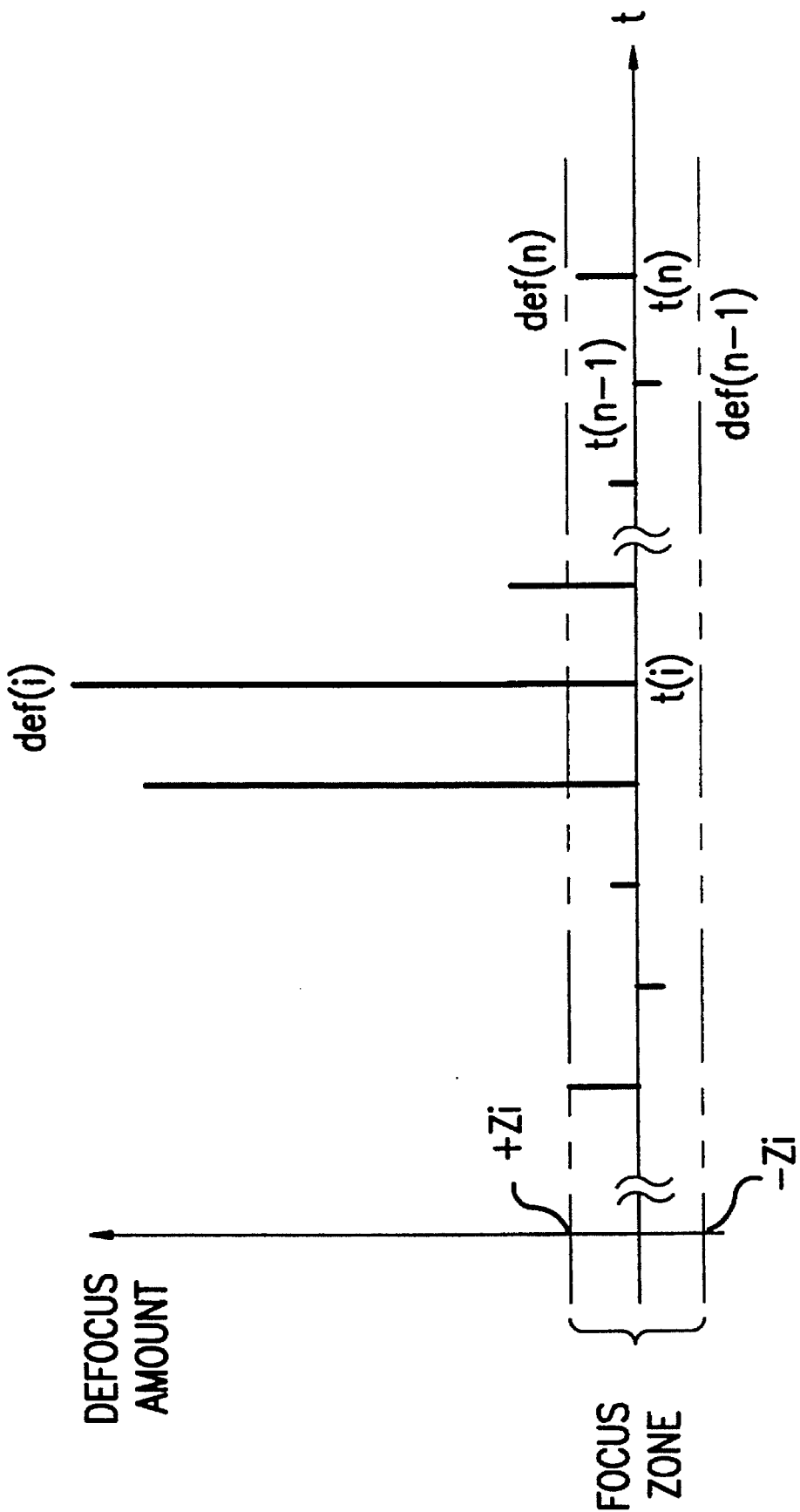
FIG. 4 shows another example of the defocus amounts detected following focussing.

FIG. 4 shows large defocus amounts detected following focussing. This may occur when the camera is shaken or something other than the subject momentarily passes in front of the camera. It is best in this example to suppress further lens driving.

Figure 5:
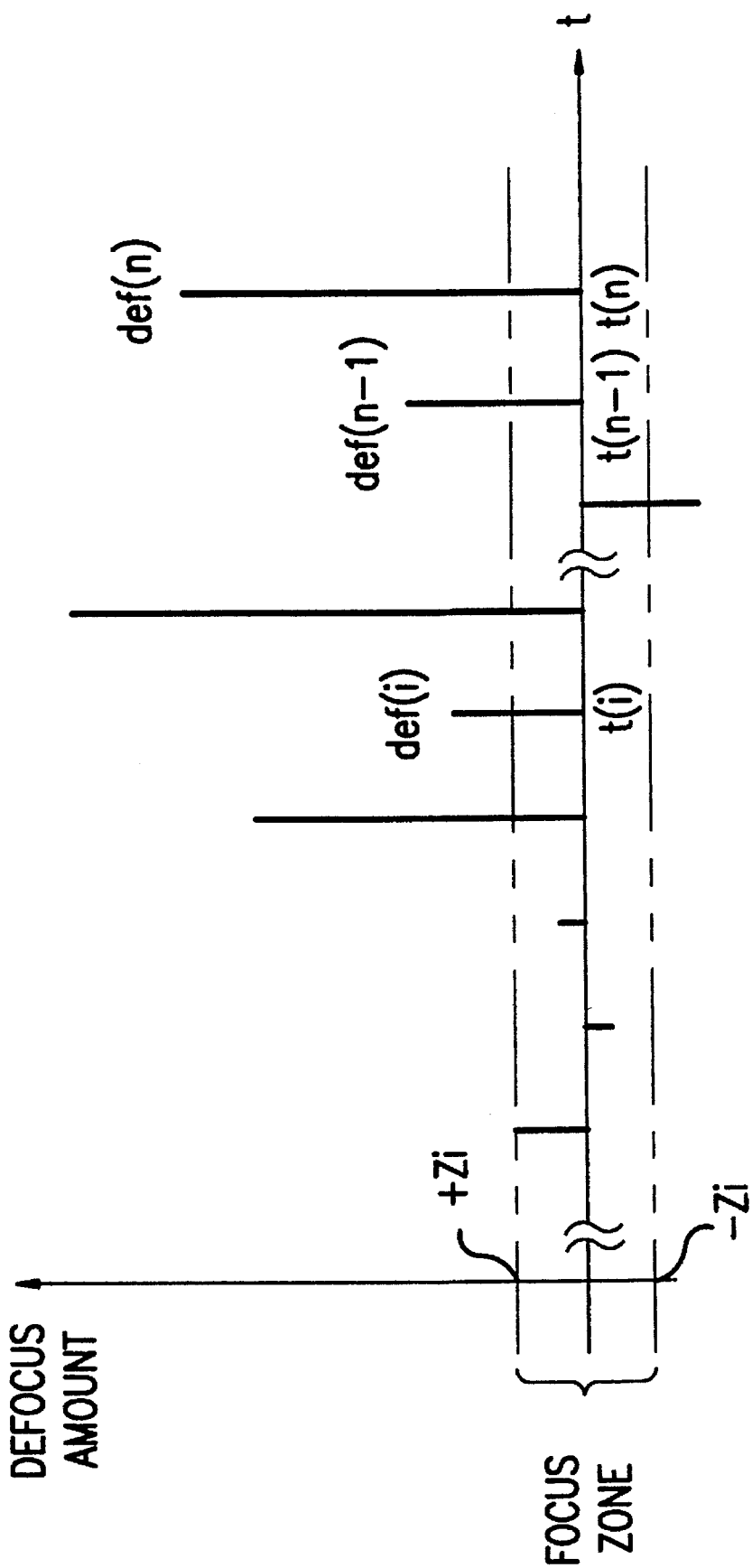
FIG. 5 shows another example of the defocus amounts detected following focussing.

FIG. 5 shows an example where the defocus amounts fluctuate irregularly following focussing. This occurs when subjects change or when the subject moves irregularly following focussing. It is again best to suppress further lens driving in this example.

Figure 6:
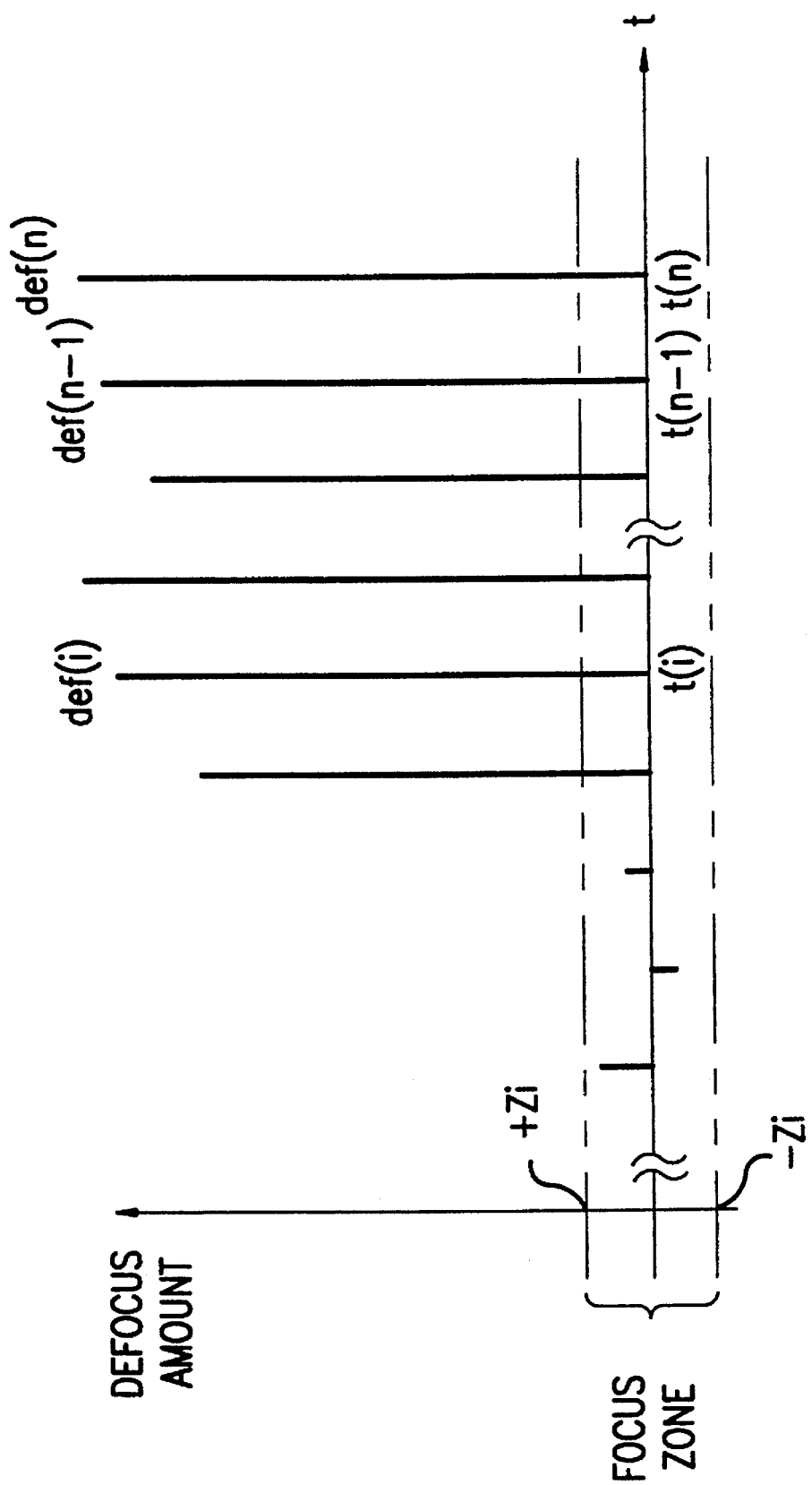
FIG. 6 shows another example of the defocus amounts detected following focussing.

FIG. 6 shows an example where the defocus amounts are largely stable following focussing. This occurs when the camera is aimed at a different subject after focussing. However, unlike the example shown in FIG. 4, lens driving should be resumed in this example to effect focus adjustment relative to the new subject.

To resume lens driving only in selected cases based on fluctuations in defocus amounts following focussing, this embodiment calculates the average value and the variance based on previous defocus amounts and the newly detected defocus amount each time a new defocus amount is detected. Lens driving is resumed only when these values meet certain criteria.

The determination as to how much previous data is used to calculate the average value and the variance is made by setting a predetermined time with regard to the servo responsiveness. Calculations are performed based on the previous data during this preset time interval preceding the present time. However, the number of defocus amounts within the predetermined time interval is not fixed because the spacing between distance measurements changes in accompaniment with the accumulation time in the sensor. The central time $t(i)$ from the sensor accumulation period and the defocus amount $def(i)$ calculated from this accumulation are stored in memory as a pair. The time from the present time backward from the preset time interval is traced and the k defocus amounts from the central time $t(i)$ following this time to the present are used in the calculations.

However, there may be constraints on the memory capacity and therefore a limit to the number of defocus data items that can be stored. Thus, each time a new data item is detected, the oldest data item is erased so the most recent defocus data items are always stored in the memory.

When the subject brightness is high, the distance measurement spacing becomes shorter. Because accumulation times become shorter and because the number of data items within the above-described preset time interval becomes a maximum, the number of data items to be stored in memory is found by dividing the preset time interval by the shortest distance measurement spacing. At times it may be impractical to store this many data times in memory because of the constraints on the memory capacity. Therefore, the average value and the variance are calculated based on all the stored data items. The number of data items increases as the calculation capacity of the microcomputer increases and as the execution time for the AF algorithm becomes shorter.

The average value Dm and variance Dd of the defocus amounts may be calculated using the following equations based on the defocus data items within the time interval preceding the present time.

$$Dm=(1/k)\Sigma def(n-j) \tag{10}$$

Here, $\Sigma$ indicates the sum over j=0 to (k−1).

$$Dd=(1/(k-1))\Sigma(def(n-j)-Dm)^2 \tag{11}$$

Here, $\Sigma$ indicates the sum over j=0 to (k−1).

In Equations 10 and 11, def(n) is the most recent defocus amount, and def(n−k+1) is the kth previous defocus amount.

In the actual microcomputer calculation process, Equations 10 and 11 are conducted by successively reading past data where the central time $t(i)$ meets the condition:

$$t(n)-Tf \leq T(i) \tag{12}$$

where Tf is the above-described preset time interval. The number k of data items within the preset time interval T is found secondarily with these summing calculations.

However, because there are cases where the defocus amounts detected during lens driving are included in the defocus amount data items that meet the condition in Equation 12, all the data items that satisfy Equation 12 are examined to determine if the items include data obtained from distance measurements following the halting of the lens. When all the data items are not items obtained following the halting of the lens, lens driving must not be performed.

With each distance measurement, the abovedescribed average distance measurement position Pm(i) (expressed as a pulse) is stored in the memory with the central time $t(i)$ of the sensor accumulation period and the defocus amount def(i) detected from this accumulation. In other words, with each distance measurement, the accumulation central time $t(i)$, the defocus amount def(i) and the average distance measurement position Pm(i) are stored in memory. It is easy to determine whether data items during lens driving are included by examining whether all of the average distance measurement positions Pm(i) that corresponds to the accumulation central times $t(i)$ that satisfy Equation 12 are equal (i.e. are the same as Pm(n)).

When all of the average distance measurement positions Pm(i) are the same, the average value Dm and the variance Dd are calculated using Equations 10 and 11. Lens driving is resumed when both of the following two conditions are satisfied.

$$Dm \geq Zfocus \tag{13}$$

$$Dd \leq Zd \tag{14}$$

Equation 13 indicates the average defocus amount Dm is greater than the focus zone Zfocus average defocus amount. Equation 14 indicates the variance Dd is smaller than the threshold value Zd. In the example shown in FIG. 3, Equation 13 is not satisfied so lens driving is suppressed. In the examples shown in FIGS. 4 and 5, Equation 14 is not satisfied, so lens driving is suppressed. However, in the example shown in FIG. 6, both Equations 13 and 14 are satisfied and lens driving is resumed in accordance with this invention.

Using the lens driving resumption determination from Equations 13 and 14, lens driving is resumed only when the defocus amount is stable and several defocus amounts have been detected following focussing. In all other cases, lens driving is suppressed.

Figure 7:
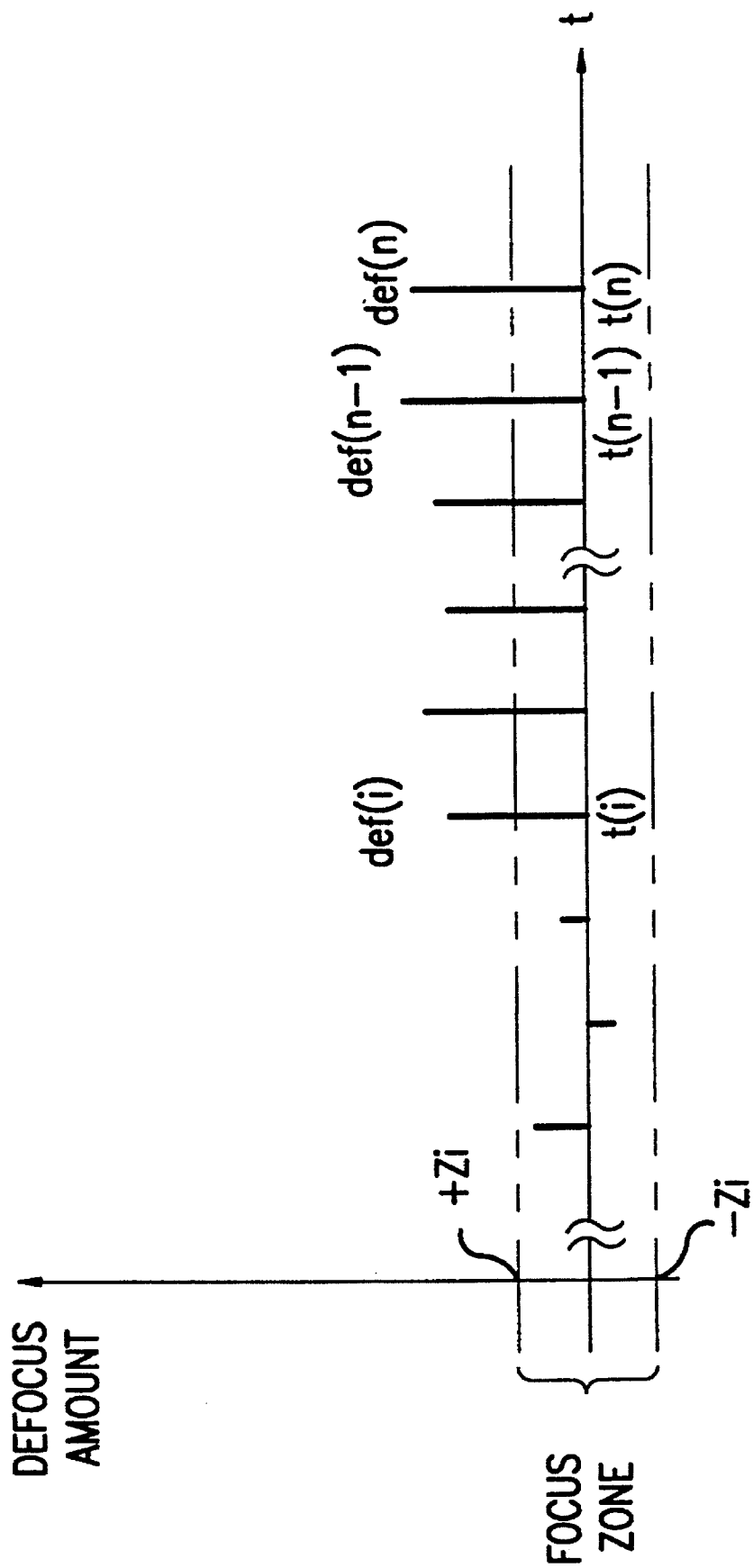
FIG. 7 shows another example of the defocus amounts detected following focussing.

Ideally, the threshold value Zd of Equation 14 should not be fixed because it is not desirable for lens driving to be frequently conducted when the defocus amount is small. However, when the defocus amount is large and to a certain extent stable, it is best to resume lens driving to focus on the subject since this might be the subject on which the photographer wants to focus. For example, when the average defocus amount Dm is close to the focus zone Zfocus as in FIG. 7, then a more suitable lens driving resumption determination is possible following focussing by changing the threshold value Zd from the example shown in FIG. 6 having a greater average defocus amount Dm.

In this instance, Zd may be made large when Dm is large. Because the square root of the variance Zd in the defocus amount is the standard deviation having the same units as the defocus amount, then Zd can be selected, for example, by making Zd proportional to $Dm^2$, as in:

$$Zd=KDm^2 \tag{15}$$

where K is a constant of proportionality. For example when $K=0.2^2$, the average defocus amount is 1 (mm), then the variance becomes 0.2 (mm) and the standard deviation becomes 0.04 (mm$^2$).

Equation 15 is illustrative and is not limiting as it is readily apparent to appropriately select the functional relationship between the average value Dm and the variance Zd through experiments or the like.

Figure 8:
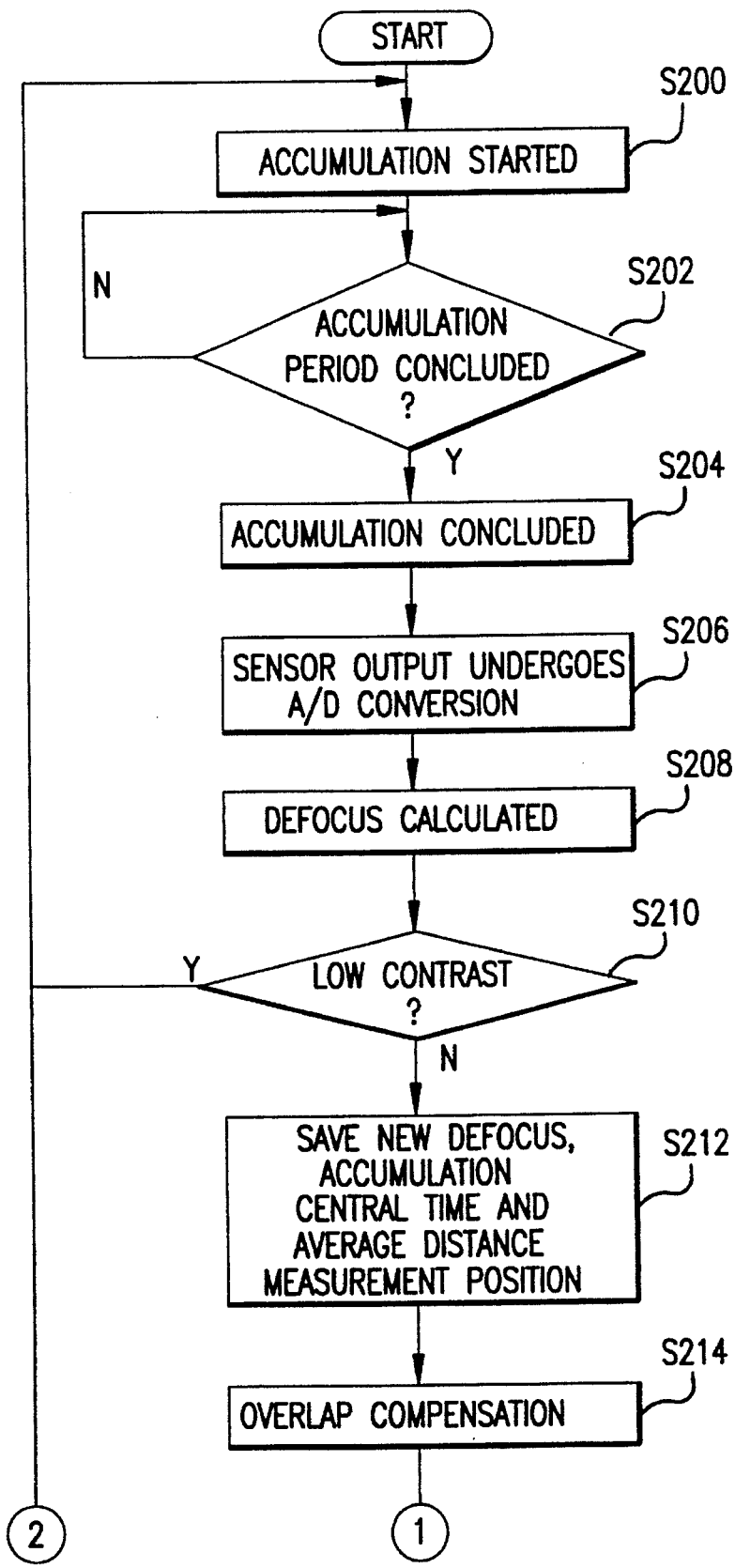
FIG. 8 is a flowchart of a lens driving control program of the present invention.
Figure 9:
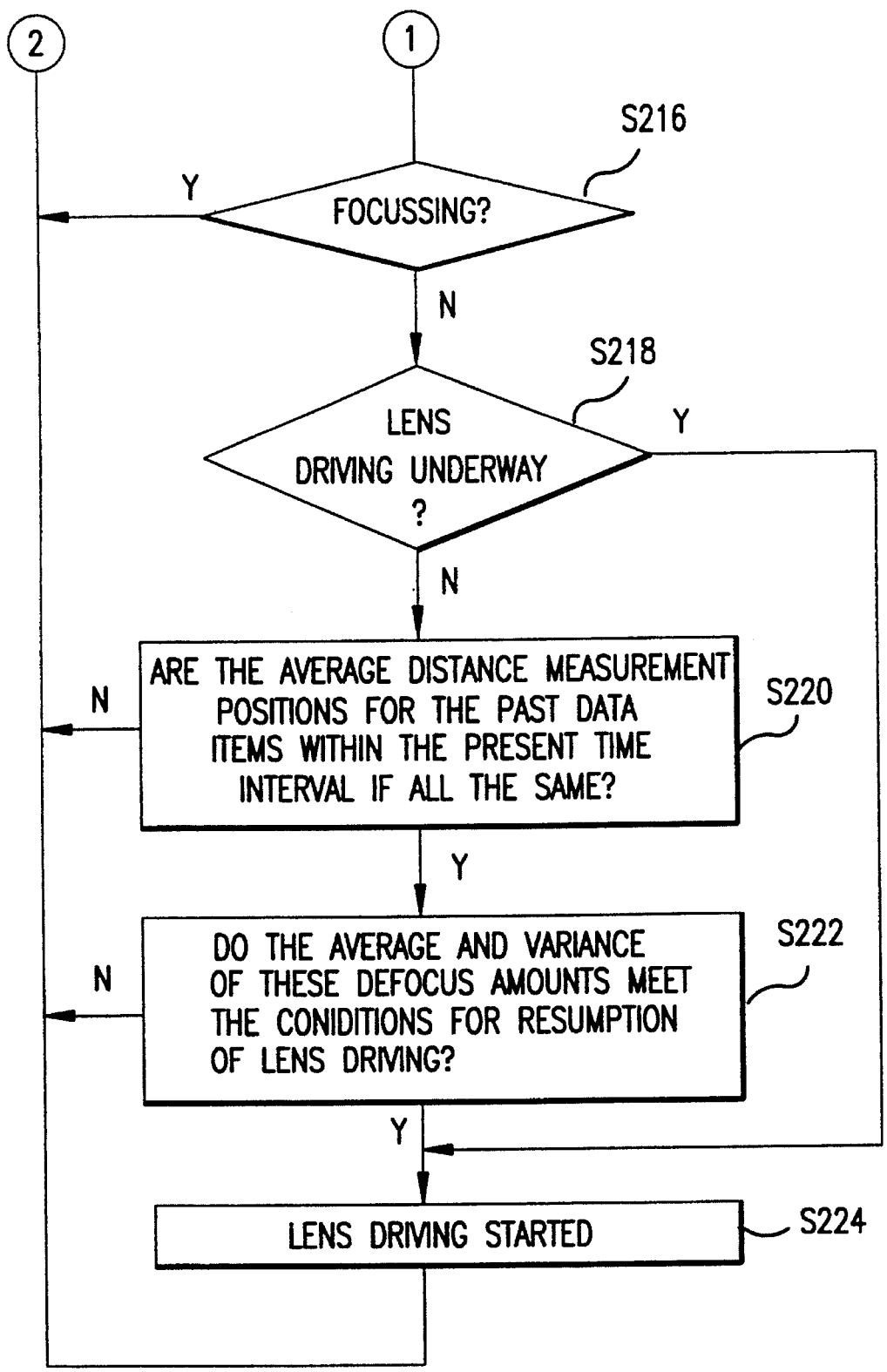
FIG. 9 is a flowchart of a lens driving control program continuing from FIG. 8.
Figure 10:
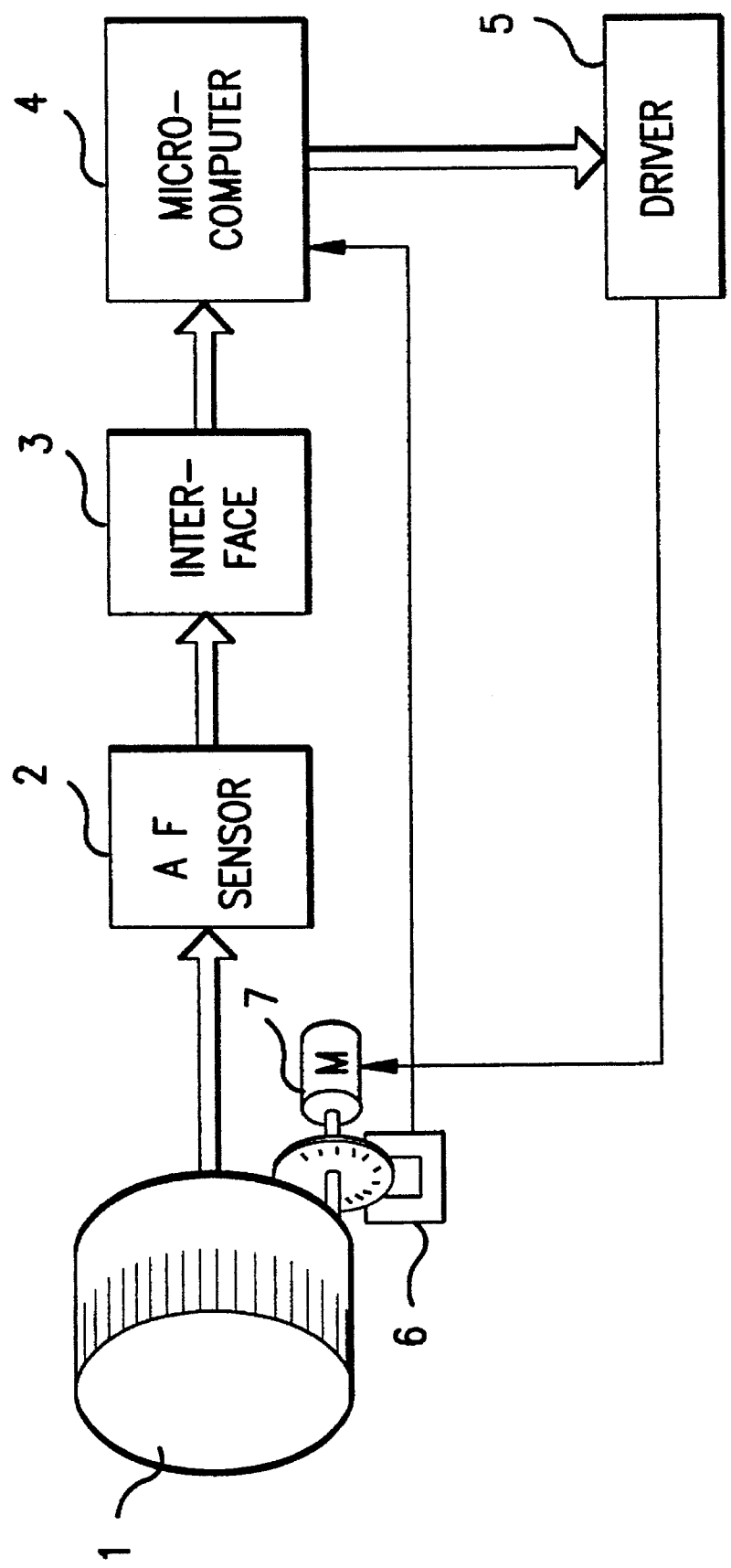
FIG. 10 is an automatic focus adjustment device.
Figure 11:
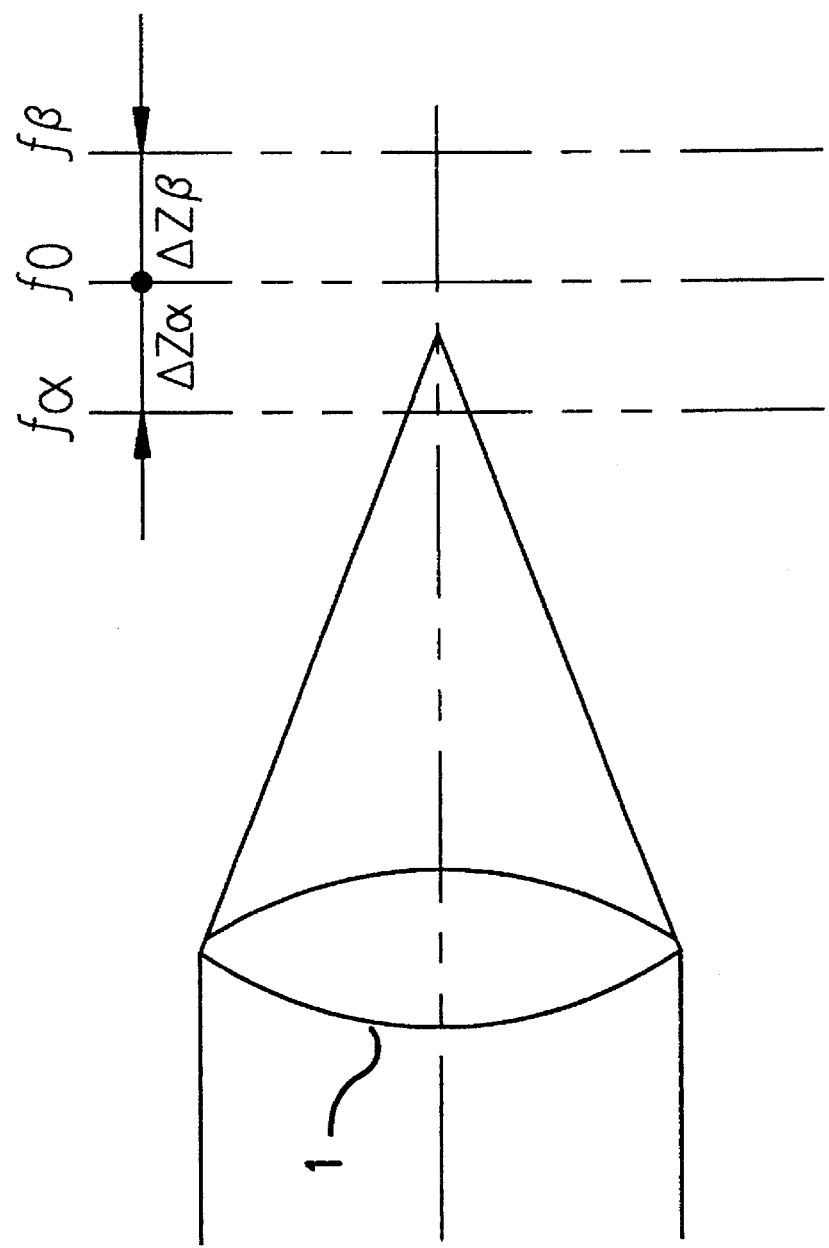
FIG. 11 shows defocus amounts.
Figure 12:
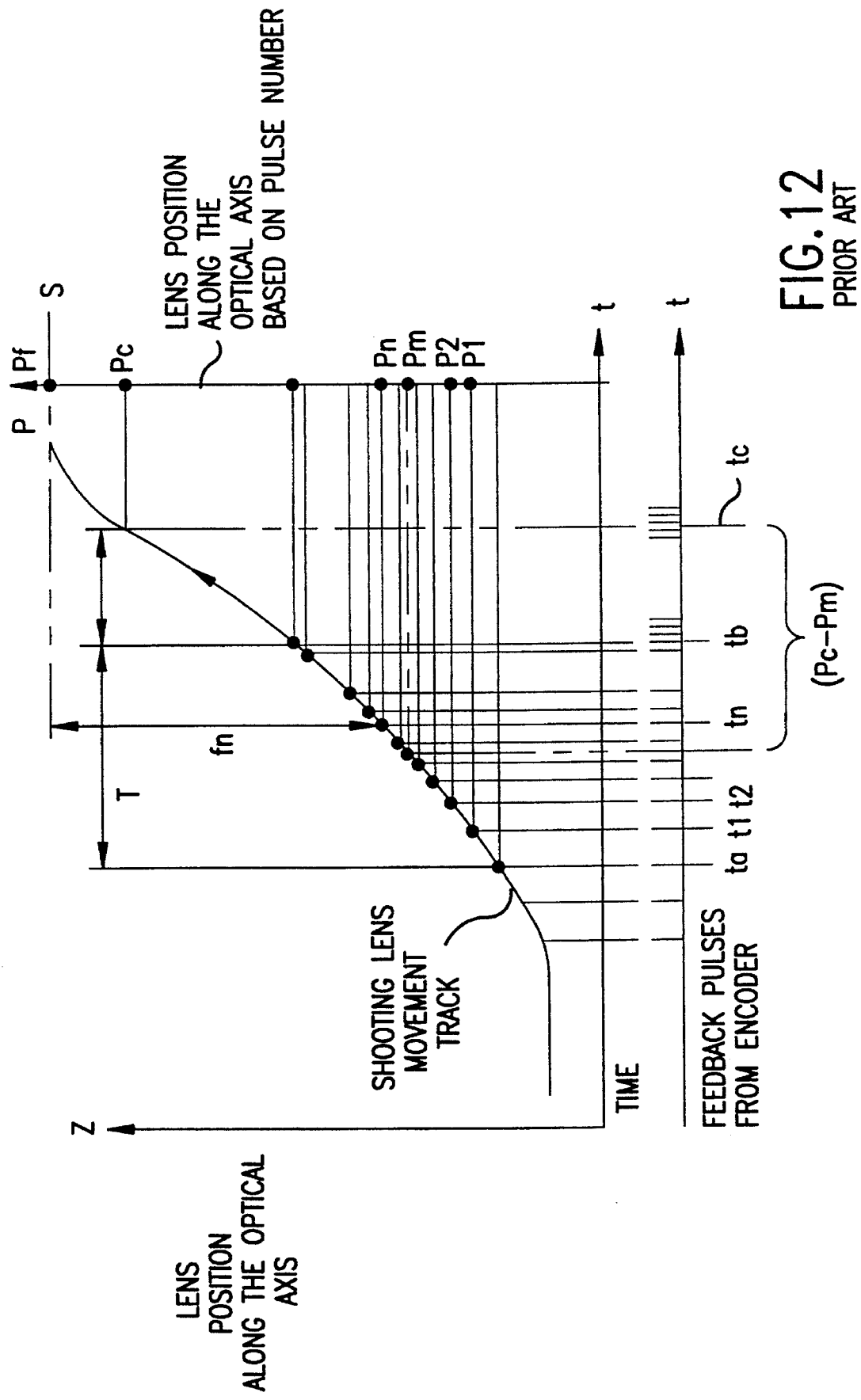
FIG. 12 shows the shooting lens being driven to effect focussing on the subject.
Figure 13:
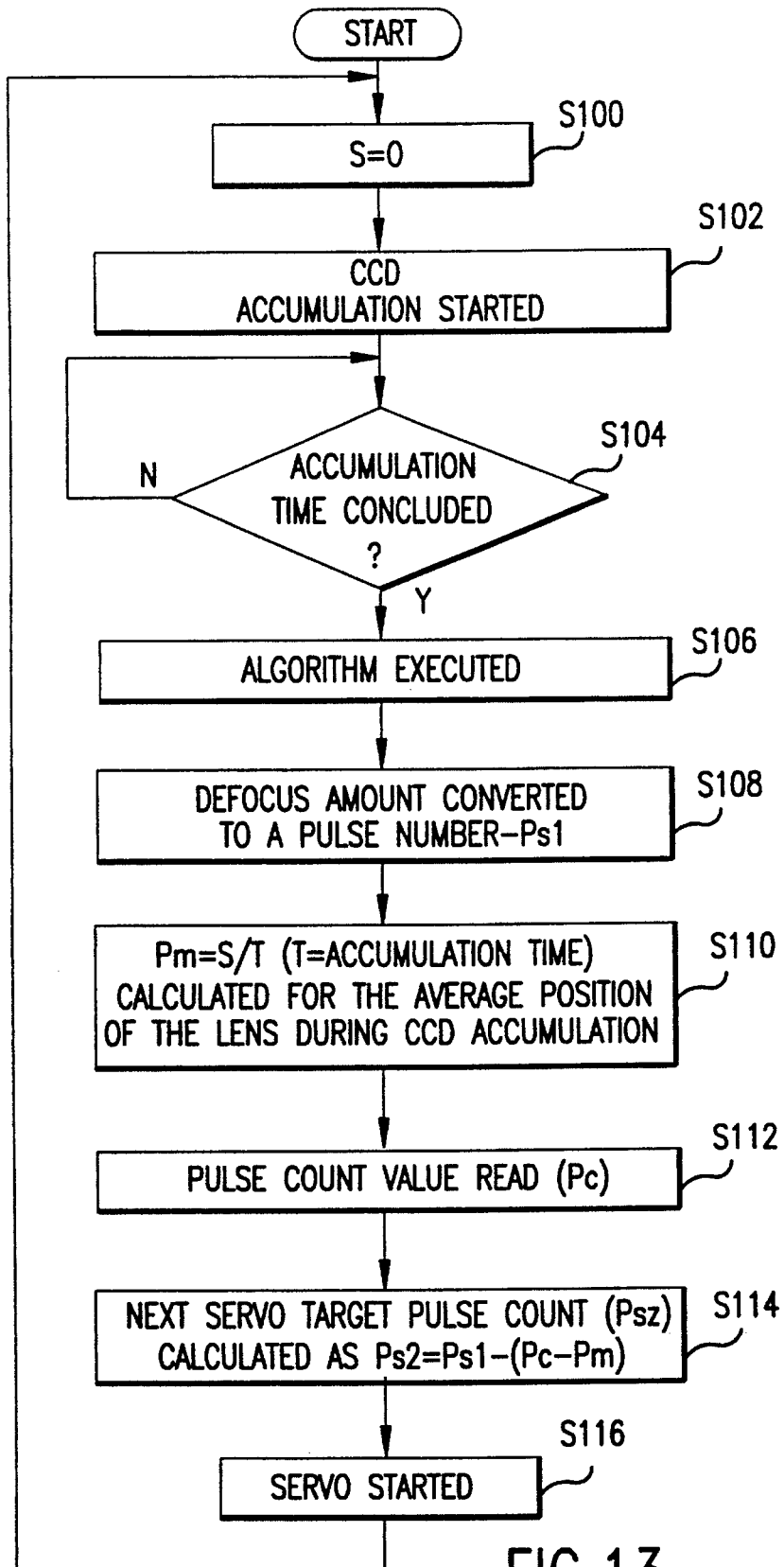
FIG. 13 is a flowchart of a prior art automatic focus adjustment method.
Figure 14:
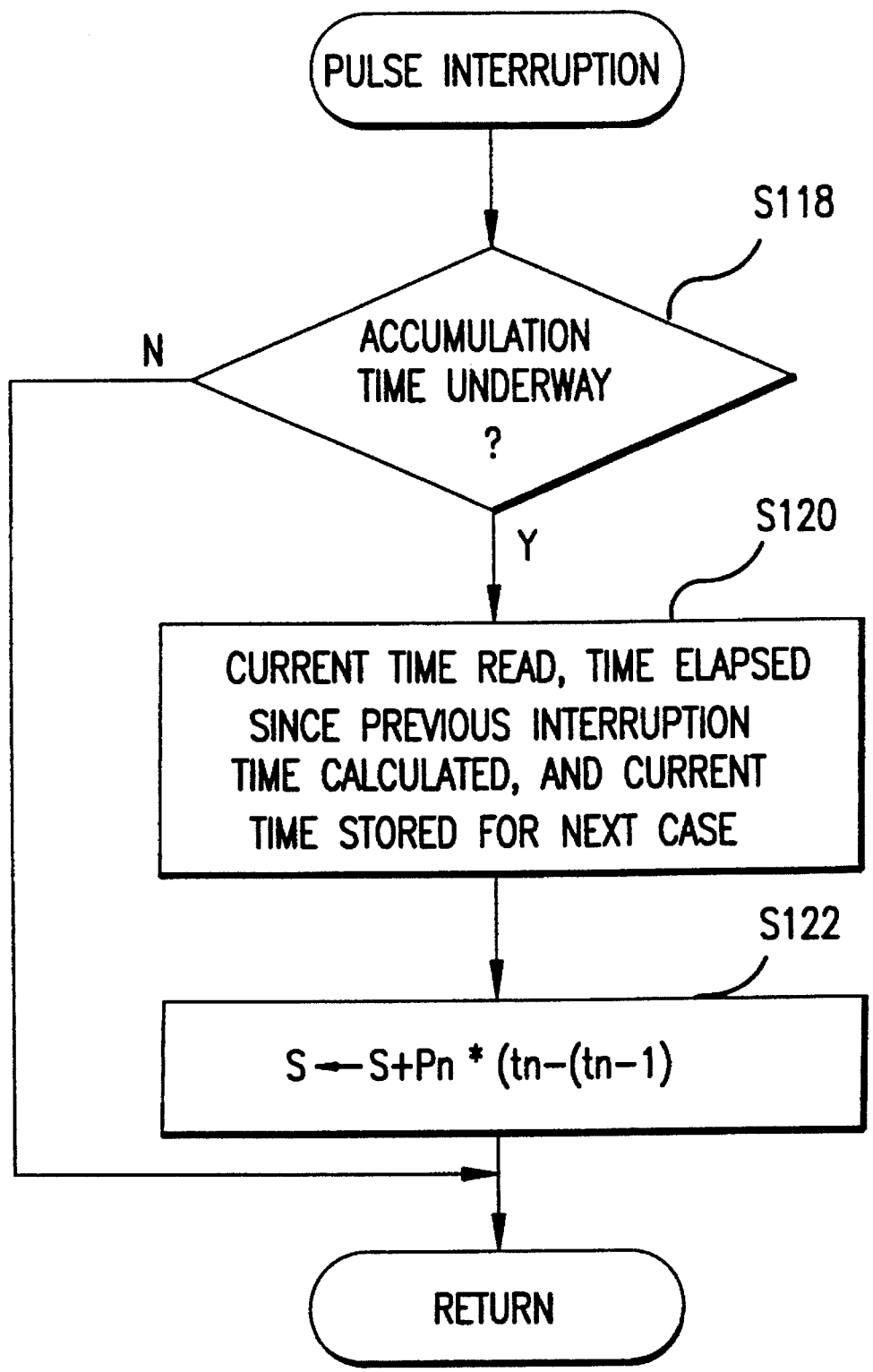
FIG. 14 is a flowchart of a prior art automatic focus adjustment method.

FIGS. 8 and 9 are flowcharts showing the lens driving control program of the microcomputer 12. The operation of the present embodiment will be explained hereafter with reference to these flowcharts. In FIGS. 8 and 9, steps relating to the overlap servo shown in the above-described FIGS. 13 and 14 are omitted, but the average distance measurement position is found using a method similar to the method described with respect to FIGS. 13 and 14. In addition, there may be a "one shot AF mode" in which once focussing is effected in the AF servo, subsequent lens driving may be prevented as long as the release button is not released and then re-depressed.

Accumulation starts in the AF sensor in step S200. Step S202 determines whether the accumulation period has concluded when either the soft AGC time on a timer elapses or an interruption signal of the hard AGC is detected. In this embodiment, the average accumulation time is also calculated.

Following completion of the accumulation period, (step S204) in step S206, the image signals successively output from the AF sensor undergo A/D conversion in the A/D converter built in the microcomputer and are then stored in RAM. In the following step S208, these data items are processed using a preset algorithm to calculate the defocus amounts. Step S210 determines whether the calculation of the defocus amount has been completed. When calculation of the defocus amount has not been completed due to low contrast or the like, the program returns to step S200 and immediately conducts the next distance measurement. If calculation of the defocus amount has been completed, the average distance measurement position during sensor accumulation, the defocus amount calculated in step S208 and the central time during the sensor accumulation period in step S202 are stored in memory as new data items in step S212. In this manner, only a select number of these data items are stored. Step S212 may also erase the oldest data item. In step S214, the overlap correction described in FIG. 13 is accomplished and the pulse number corresponding to the lens driving amount is calculated.

In step S216, the focus determination is accomplished using Equations 8 and 9. When the lens is in focus, the program returns to step S200 and performs the next distance measurement. Otherwise, the program advances to step S218. Step S218 determines whether lens driving is underway. If so, the criteria in the subsequent steps S220 and S222 are skipped and lens driving is continued based on the calculated lens driving amount from step S214. On the other hand, if lens driving is not underway, step S220 determines whether the average distance measurement positions Pm(i) corresponding to the accumulation central times t(i) of the past data items stored in memory within the preset time interval Tf are the same. In other words, step S220 determines whether the defocus amounts are amounts measured at the same position when the shooting lens is halted. If these are not the same, the program returns to step S200 and conducts the next distance measurement because sufficient data following halting of the lens cannot be obtained. If the average distance measurement positions Pm(i) are all the same, a determination is made in step S222 whether the average value Dm and the variance Dd of these defocus amounts satisfy Equations 13 and 14. If the conditions are satisfied, the program advances to step S224 and lens driving is started. If the conditions are not satisfied, the program returns to step S200 and conducts the next distance measurement. In this instance, either the average defocus amount Dm calculated from Equation 13 or the newest defocus amount can be used as the lens driving amount when lens driving is resumed in step S224.

This embodiment describes one example of the statistical processing of the defocus amounts where the average value and the variance are calculated. A determination to resume focus adjustment of the shooting lens is made based on these values. However, this embodiment is intended to be illustrative and statistical processing of the defocus amounts is not limited to this embodiment.

In addition, the average value and the variance of the defocus amounts are calculated over the preset time interval Tf preceding the present time and following focussing. It would also be within the scope of this invention to calculate the average value and the variance of all defocus amounts following focussing depending on the constraints on the computation time of the microcomputer or the capacity of the memory.

Furthermore, other embodiments may allow the photographer to select the preset time interval Tf in consideration of the responsiveness of focus adjustment.

In the above described embodiment, the distance measurement device 11 includes the photosensitive device. The microcomputer 12 includes a defocus amount computation device, an average/variance computation device and the statistical processing device. The microcomputer 12 and the driver 13 are included within the drive control device.

As described above, the shooting lens defocus amount is calculated based on the focus state detection signals repeatedly output from the charge accumulation type photosensitive device. Focus adjustment is conducted until the shooting lens is in the predetermined focussing state in accordance with this defocus amount. After the shooting lens has reached this predetermined focussing state, the calculated defocus amounts are statistically processed. Resumption of the focus adjustment is determined based on this processing. For example, focus adjustment is resumed when the average value is greater than a first preset value and the variance is smaller than a second preset value. With this structure, the focus adjustment is resumed only when the defocus amounts, after focussing, are detected in a stable manner several times. This avoids focus adjustment being conducted frequently following focussing. Therefore, it is possible to increase focussing precision and the stability of focus adjustment following focussing.

In addition, the average value and the variance are calculated for the calculated defocus amounts based on the focus state detection signals output over a preset time interval preceding the present time and following focussing. The determination to resume focus adjustment is based on this average value and the variance. Accordingly, the memory capacity of the memory can be conserved to keep mounting costs down while at the same time reducing the time needed for calculations and thereby boosting the responsiveness of focus adjustment.

Furthermore, the preset time interval for determining the past data amounts of the defocus amounts used in calculating the average value and the variance can be changed at will. Thus, the photographer can establish at will the responsiveness of focus adjustment following focussing.

Furthermore, the second preset value may be established based on the average value of the calculated defocus amounts after the shooting lens has reached the focussing state. Alternatively, the second preset value may be approximately proportional to the square of the average value of the calculated defocus amounts after the shooting lens has reached the focussing state to make a more appropriate determination for the resumption focus adjustment following focussing.

While this invention has been described with reference to specific embodiments, the description is illustrative only and is not considered as limiting the scope of the invention. Various other modifications and changes may occur to those skilled in the art without departing from the spirit and scope of the invention.

What is claimed is:

1. An automatic focus adjustment device comprising:
    focus detection means for repeatedly outputting focus detection signals relating to a photographic subject viewed through a shooting lens, so as to output a sequence of the focus detection signals representing focus conditions over time;
    defocus amount computation means for calculating defocus amounts of the shooting lens based on the focus detection signals output from the focus detection means, so as to output the calculated defocus amounts in sequence over time;
    drive control means for determining whether the shooting lens is in a predetermined focus state based on the defocus amounts and for conducting focus adjustment by driving the shooting lens until the shooting lens is in the predetermined focus state, the focus adjustment being conducted based on the defocus amounts calculated by the defocus amount computation means; and
    statistical processing means for statistically processing a plurality of the calculated defocus amounts that have been output in sequence by the defocus amount computation means after the shooting lens has been determined to be in the predetermined focus state, the drive control means stopping the focus adjustment when it is determined that the shooting lens is in the predetermined focus state and subsequently resuming focus adjustment of the shooting lens when a result from the statistical processing means satisfies a predetermined condition, otherwise the drive control means continuing to stop the focus adjustment.

2. The automatic focus adjustment device of claim 1, wherein the predetermined condition includes a first value representing a threshold average defocus amount and a second value representing a threshold defocus amount variance, and wherein the statistical processing means calculates an average value and a variance of the calculated sequence of defocus amounts output after the shooting lens is determined to be in the predetermined focus state, the drive control means resuming focus adjustment when the average value calculated by the statistical processing means is greater than the first value and the variance is smaller than the second value.

3. The automatic focus adjustment device of claim 2, wherein the statistical processing means calculates the average value and the variance of the calculated sequence of defocus amounts output by the defocus amount computation means over a time interval.

4. The automatic focus adjustment device of claim 3, wherein the time interval is changeable.

5. The automatic focus adjustment device of claim 2, wherein the second value is set based on the average value calculated by the statistical processing means.

6. The automatic focus adjustment device of claim 2, wherein the second value is approximately proportional to a square of the average value calculated by the statistical processing means.

7. The automatic focus adjustment device of claim 1, wherein the focus detection means is an electric charge accumulation type photosensitive sensor that receives light from the photographic subject through the shooting lens.

8. An automatic focus adjustment device comprising:
    a focus detection device that repeatedly outputs focus detection signals relating to a photographic subject viewed through a shooting lens, so as to output a sequence of the focus detection signals representing focus conditions over time;
    a defocus amount computation device that calculates defocus amounts of the shooting lens based on the focus detection signals output from the focus detection device, so as to output the calculated defocus amounts in sequence over time;
    a drive control device that determines whether the shooting lens is in a predetermined focus state based on the defocus amounts and that conducts focus adjustment by driving the shooting lens until the shooting lens is determined to be in a predetermined focus state, the adjustment being conducted based on the defocus amounts calculated by the defocus amount computation device; and
    an average/variance computation device that calculates an average value of a plurality of the calculated defocus amounts that have been output in sequence by the defocus amount computation device after the shooting lens has been determined to be in the predetermined focus state and that calculates a variance between the average and each of the calculated defocus amounts output after the shooting lens has been determined to be in the predetermined focus state, the drive control device stopping the focus adjustment when it is determined that the shooting lens is in the predetermined focus state and subsequently resuming focus adjustment of the shooting lens when the average value calculated by the average/variance computation device is greater than a first value and the variance is smaller than a second value, otherwise, the drive control device continuing to stop the focus adjustment.

9. The automatic focus adjustment device of claim 8, wherein the average/variance computation device calculates the average value and the variance of the calculated sequence of defocus amounts output by the defocus amount computation device over a time interval.

10. The automatic focus adjustment device of claim 9, wherein the time interval is changeable.

11. The automatic focus adjustment device of claim 8, wherein the second value is set based on the average value calculated by the average/variance computation device.

12. The automatic focus adjustment device of claim 8, wherein the second value is approximately proportional to a square of the average value calculated by the average/variance computation device.

13. The automatic focus adjustment device of claim 7, wherein the focus detection device is a photosensitive device that receives light from the photographic subject through the shooting lens.

14. An automatic focus adjustment method comprising the steps of:
    outputting focus detection signals from an auto focus sensor, the focus detection signals relating to a photographic subject viewed through a shooting lens and being output in sequence so as to represent focus conditions over time;

calculating defocus amounts based on the focus detection signals output from the sensor, the calculated defocus amounts being output in sequence over time;

conducting focus adjustment by driving the shooting lens until the shooting lens is in a predetermined focus state based on the calculated defocus amounts, the focus adjustment being stopped when it is determined that the shooting lens is in the predetermined focus state;

statistically processing a plurality of the calculated defocus amounts that have been output in sequence after the shooting lens has been determined to be in the focus state; and resuming focus adjustment of the shooting lens when the result of the statistical processing satisfies a predetermined condition, otherwise continuing to stop the focus adjustment.

15. The automatic focus adjustment method of claim 14, wherein the predetermined condition includes a first value representing a threshold average defocus amount and a second value representing a threshold defocus amount variance, and wherein the statistically processing step comprises the step of calculating an average value and a variance of the calculated sequence of defocus amounts that have been output after the shooting lens has been determined to be in the predetermined focus state.

16. The automatic focus adjustment method of claim 15, wherein the resuming step comprises the step of resuming focus adjustment when the calculated average value of the defocus amounts is greater than the first value and the calculated variance is smaller than the second value.

17. The automatic focus adjustment method of claim 16, wherein the second value is set based on the calculated sequence of defocus amounts.

18. The automatic focus adjustment method of claim 16, wherein the second value is approximately proportional to a square of the average value of the calculated sequence of defocus amounts after the shooting lens has been determined to be in the predetermined focus state.

19. The automatic focus adjustment method of claim 15, wherein the average value and the variance of sequence of defocus amounts are calculated based on the focus detection signals output from the auto focus sensor over a time interval.

20. The automatic focus adjustment method of claim 19, further comprising changing the time interval.

21. The automatic focus adjustment method of claim 14, wherein the auto focus sensor is a charge accumulation type photosensor, the auto focus sensor receiving light rays from the photographic subject through the shooting lens and converting the light rays to electrical charges that are output as the focus detection signals.

* * * * *